United States Patent [19]

Matthews

[11] Patent Number: 4,605,977
[45] Date of Patent: Aug. 12, 1986

[54] AIR BEARING HEAD DISPLACEMENT SENSOR AND POSITIONER

[75] Inventor: Hugh B. Matthews, Boxboro, Mass.

[73] Assignee: Sperry Corporation, New York, N.Y.

[21] Appl. No.: 561,365

[22] Filed: Dec. 14, 1983

[51] Int. Cl.⁴ .......................... G11B 21/20; G11B 5/60
[52] U.S. Cl. ..................................... 360/103; 360/102; 360/109
[58] Field of Search ............... 360/102, 103, 104, 105, 360/107, 109

[56] References Cited

U.S. PATENT DOCUMENTS

| | | | |
|---|---|---|---|
| 3,201,526 | 8/1965 | Wessels et al. | 360/103 |
| 3,706,861 | 12/1972 | Giel | 360/103 |
| 3,732,552 | 5/1973 | Walraven | 360/103 |
| 3,863,124 | 1/1975 | Pierce et al. | 360/103 |
| 4,130,847 | 12/1978 | Head et al. | 360/103 |

FOREIGN PATENT DOCUMENTS

1433943  4/1976  United Kingdom ............... 360/103

Primary Examiner—John H. Wolff
Assistant Examiner—Matthew J. Bussan
Attorney, Agent, or Firm—Howard P. Terry; Arnold L. Albin

[57] ABSTRACT

A magnetic head slider for supporting a flying head on a magnetic disk has a plurality of rails extended longitudinally between the slider and the disk which provide the air bearing surface and define a channel parallel to the motion of the data track. A flexible beam is affixed to the leading edge of the channel providing a cantilever structure. A magnetic head is mounted on the free end of the cantilever. A pair of oppositely polarized piezoelectric crystals are mounted on the cantilever assembly. When energized by an electrical driving source, the cantilever beam is flexed upwards or downwards thereby changing the distance of the magnetic head from the disk. A capacitive proximity sensor is coupled to the magnetic head for sensing the height of the head above the data track. The output of the sensor is fed to the driving source and energizes the piezoelectric crystals in the polarity desired for the corresponding deflection of the cantilever structure. Thus, the sensor continuously monitors the height of the magnetic head from the track and provides a correction signal to maintain the transducer at a constant predetermined height above the track. In a preferred embodiment, the beam is formed from silicon nitride composition and treated by means of an ion implantation process to provide a conductive electrode for the capacitance proximity sensor. By connecting the proximity sensor, the deflectable piezoelectric transducer, and the electrical driving circuit in a closed loop, the magnetic head is maintained at a predetermined distance from the magnetic disk, notwithstanding perturbations in disk surface and changes due to dynamic instability.

13 Claims, 13 Drawing Figures

AIR BEARING HEAD DISPLACEMENT SENSOR AND POSITIONER

BACKGROUND OF THE INVENTION

1. Field of the Invention

The present invention relates to flying heads for use with magnetic-drives in computer systems and, more particularly, to an apparatus and method of fabricating a flying-head slider assembly with active control of the head-to-medium clearance in a magnetic disk drive.

2. Description of the Prior Art

In high performance magnetic disk memories of the prior art, the magnetic medium is deposited on a rigid metallic disk, eight to fourteen inches in diameter, and a magnetic transducer is prevented from touching the medium by the so-called "air bearing" effect. The magnetic transducer, also referred to as the "head", is carried by a slider which, in turn, is supported by aerodynamic forces generated by the flow of air between the rotating disk and a plurality of rail-like surfaces on the slider. Such a device is typically embodied in the Winchester technology, as developed by the International Business Machines Corporation in their Model 3340 disk memory. An extensive discussion of magnetic-disk drives is provided by Robert M. White in Disk-Storage Technology, *Scientific American*, 243, August, 1980, pp. 138–148.

The distance from the magnetic head to the recording surface in a disk system is called flying height because it is the height of the air bearing or slider bottom surface above the disk. The flying height is chosen during system design as a compromise between the features of maximum information density, which requires a small height, and a desire for reliability which requires a large height. Variables in flatness of the disk surface, disk speed variation from inner to outer track, aerodynamic instabilities, resonances of the slider, dust particles, and other factors require that the flying height be increased accordingly to prevent the slider from striking the disk surface or crashing during operations, often resulting in catastrophic destruction of the pickup head and disk surface. At the very least, a crash may cause loss of data bits. A typical compromise for flying height in common use is 20 microinches.

In order to obtain reliable performance at greater bit densities, it is desirable to reduce the height of the head above the disk. For example, a negative-pressure air-bearing suspension system has been reported which allows reducing the flying height to 12 microinches with a 3.5 inch Winchester drive, c.f. Terry Costlow, 3.5-IN. WINCHESTER DRIVE IS QUICK TO EXPLOIT THE LATEST TECHNOLOGIES, *Electronic Design*, Apr. 28, 1983, p 43.

A structure for laterally displacing a magnetic head on video or audio recording media using a piezoelectric element to align the head with a desired data track, is disclosed in U.S. Pat. No. 4,268,880, Magnetic Head Assembly, issued to Osanu Najima on May 19, 1981. However, the structure shown is not useful for controlling flying head height.

The prior art systems provide little flexibility in controlling flying height, since the various error factors discussed above must all be summed in determining the minimum allowable height. None of the prior art systems has provided apparatus for active closed-loop control of the flying height which would permit closer positional tolerances to be obtained. The present invention provides a means for sensing and dynamically controlling the head to medium height and permits reducing the average disk clearance to as low as 5±1 microinches. Substantially improved reliability and recording density results.

SUMMARY OF THE INVENTION

In accordance with the principles of the present invention, an air bearing slider for a magnetic recording system maintains a predetermined distance between the flying head and the medium. The head is dynamically displaced in response to correction signals from a slider-mounted proximity sensor.

In a preferred embodiment, the head and sensor are connected in a closed loop system, wherein an error signal derived from the correction signals and a height preset reference signal is used to drive complementary piezoelectric transducers, which flex a beam having the head mounted thereon accordingly to provide control of head-to-track spacing to 5±1 microinches, with excursion capability of 25 microinches.

BRIEF DESCRIPTION OF THE DRAWINGS

FIGS. 10.1 and 10.2 are respectively an exploded view and an elevation view showing the assembly of the piezoelectric-actuated disk follower actuator beam.

DESCRIPTION OF THE PREFERRED EMBODIMENTS

Figure 1:
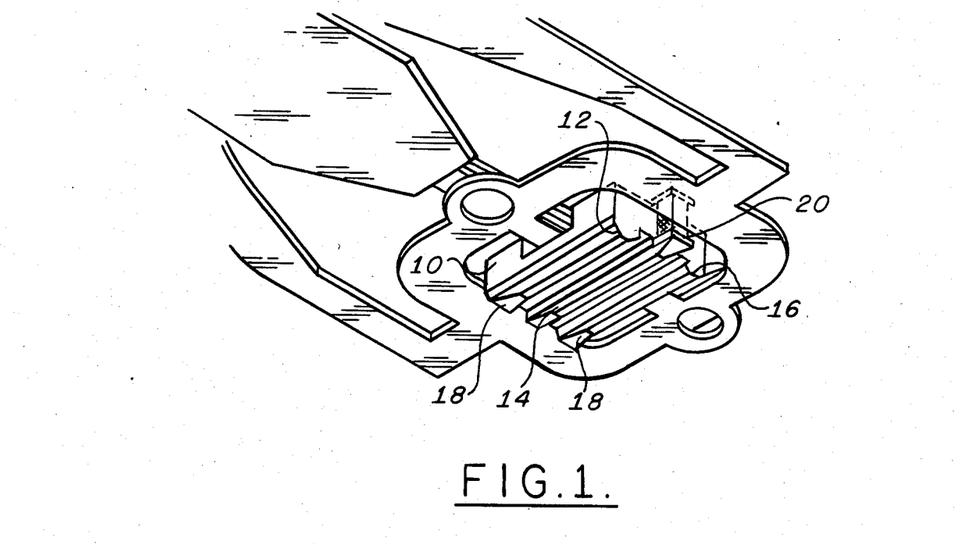
FIG. 1 is a perspective view of a slider assembly for a Winchester magnetic head.
Figure 2:
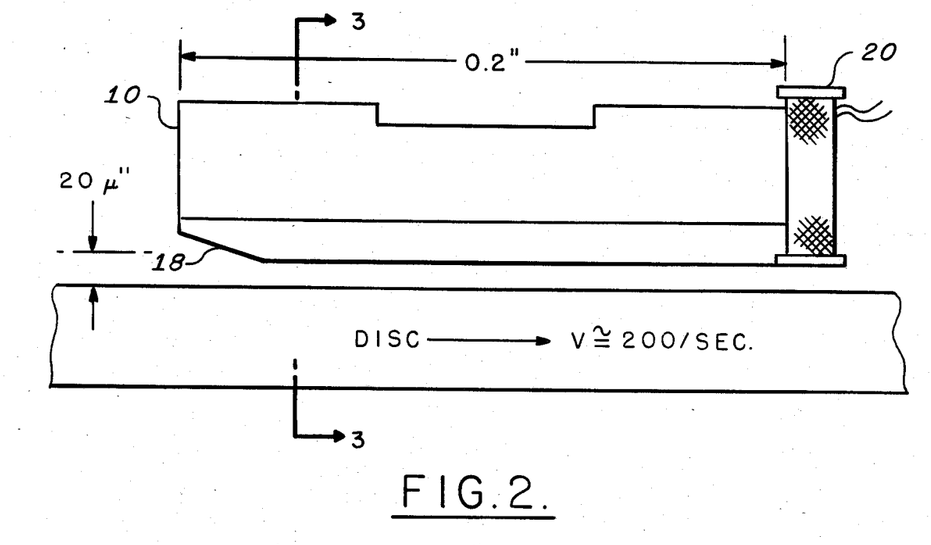
FIG. 2 is an elevation view of the Winchester head of FIG. 1 shown in cross-section in relation to a magnetic storage disk.
Figure 3:
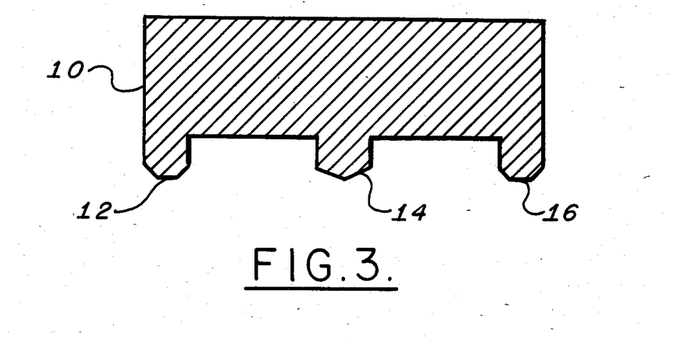
FIG. 3 is a cross section along line 3—3 of FIG. 2, showing the rails forming an air bearing structure.

Referring to FIG. 1, a Winchester head of the prior art employing an air bearing slider and conventional magnetic head is shown. The slider 10 has raised rails 12 and 16 having tapered leading edges 18. The magnetic head 20 is supported by the slider 10 and coupled to a center rail 14. When placed in proximity to a rotating magnetic disk, as shown in FIG. 2, where the disk may have a 14" diameter and spin as high as 3,000 revolutions per minute, the velocity of the head with respect to a data track in the medium approaches 200 feet per second. The flow of air between the head and the medium provides a force sufficient to support the slider and magnetic head. As shown in FIG. 3, the Winchester head of the prior art has three rails adjacent to the air bearing surface. The two outer rails govern the flow of air, while the center rail is energized by the magnetic head to provide a gap for reading and writing digital data on the medium.

Figure 4:
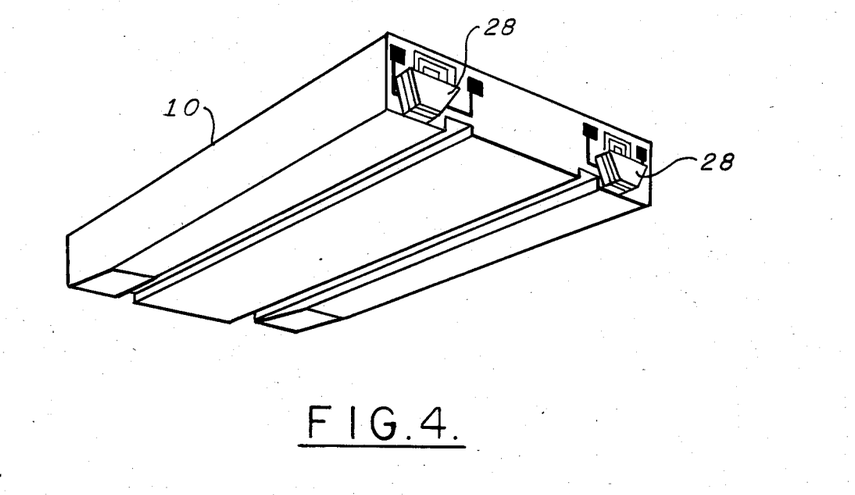
FIG. 4 shows an air bearing slider assembly in perspective using thin film heads.

An improved slider using a thin film head is shown in FIG. 4. The thin film head employs a spiral film forming an electrical conductor around a magnetic core. In addition to ease and reproducibility of fabrication, the thin film head provides greater packing density of data on the magnetic medium. Both conventional and thin film heads may be used with other magnetic recording systems employing a moving medium, such as wire, tape, drum or floppy disk.

It is desirable in the disk storage art to reduce the flying height of the magnetic head to a minimum, in order that the greatest packing density of data on the disk can be obtained. However, in the conventional Winchester head, as shown in FIG. 2, the slider is constrained to fly at a minimum distance of 20 microinches above the data track because of irregularities in the surface of the medium, dirt particles, elasticity of the structure, and other dynamic forces. The present invention has as its objective active control of the flying height to provide a way of increasing information capacity by reducing the head to disk clearance. This advantage may be obtained with both horizontal and perpendicular mode recording.

Figure 5:
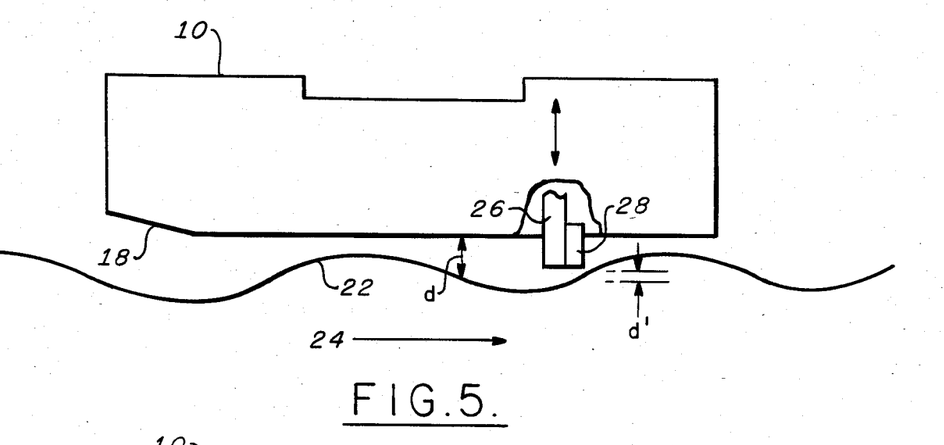
FIG. 5 is an elevation view of a servo-controlled disk follower in accordance with the invention.

FIG. 5 shows in schematic form an electronic control system called a disk follower which provides active control of the spacing between a magnetic head and the recording medium. An air bearing slider 10 flies at a variable height d above the surface of a magnetic medium 22 which is typically a magnetic disk. The bevel of the head slider faces the leading edge of the slider relative to the direction of motion of the data track, as indicated by arrow 24. A vertically movable member 26 having a thin film magnetic head 28 mounted thereon is controlled by a displacement drive and a proximity sensor with associated circuitry, not shown, to maintain the head at a constant distance d' from the surface of the magnetic medium. Thus, the slider may be constrained to fly at a safe height above the medium, while the head 28 is adjusted to variably traverse the surface of medium 22 at a minimal constant height substantially less than the flying height of the slider. In the preferred embodiment, a piezo-electric driver has provided an excursion capability of 25 microinches with control of spacing to 5 microinches being feasible.

Figure 6:
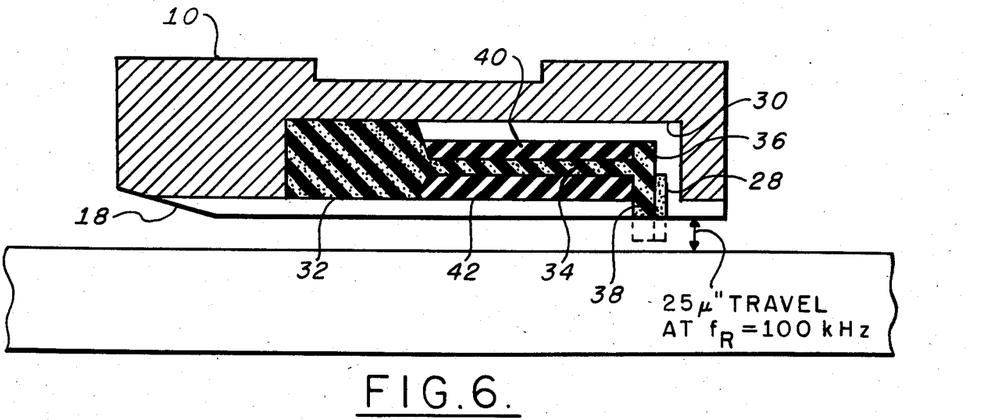
FIG. 6 is an elevation view in cross-section of a disk follower assembly, showing the piezoelectric-driven actuator beam of the present invention.

Referring now to FIG. 6, a cross-section of the structure of the disk follower assembly of FIG. 5 shows a slider 10 with a channel 30 defined by the air bearing rails. A beam 32 is mounted at its proximal edge to the leading edge of slider 10 adjoining the bevel surface 18. A flexible vane 34 extends from the proximal edge of beam 32 and further defines a hammer-shaped distal edge 36. It may be seen that beam 32, including vane 34 and distal edge 36 form a cantilevered structure wherein edge 36 is free to move in a vertical direction with respect to the plane of the magnetic medium. Affixed to distal edge 36 is thin film head 28 which thereby follows the travel of vane 34. A further region 38 is preferably comprised of an ion-implanted area for use in a capacitance-type proximity sensor. Affixed on the respective upper and lower surfaces of vane 34 are piezoelectric transducers 40 and 42. It will be clear to one skilled in the art that when piezoelectric transducers 40 and 42 are deflected by means of an external control voltage, magnetic head 28 will accordingly follow the movements of vane 34. By sensing the height of implanted region 38 above the surface of the magnetic medium, a variable voltage may be developed proportional to distance for controlling the height of head 28. Because of the small mass of the moving structure, a relatively high resonant frequency of 100 KHz is readily attainable. Further, a travel of at least 25 microinches may be attained with a beam of approximately 0.2 in longitudinal dimensions with reasonable driving voltages without overstressing the piezoelectric elements. Preferably, the piezoelectric transducer elements will be oppositely polarized with respect to ground so that one element may be driven positive to move the head in a corresponding direction and the other element may be driven positive to drive the head in the reverse direction. Since a typical slider of the prior art has a self-resonant frequency of approximately 5 KHz, it is clear that the disk follower shown herein can readily track perturbations in the disk surface without adversely affecting the flying height of the slider.

Figures 7, 8, 9:
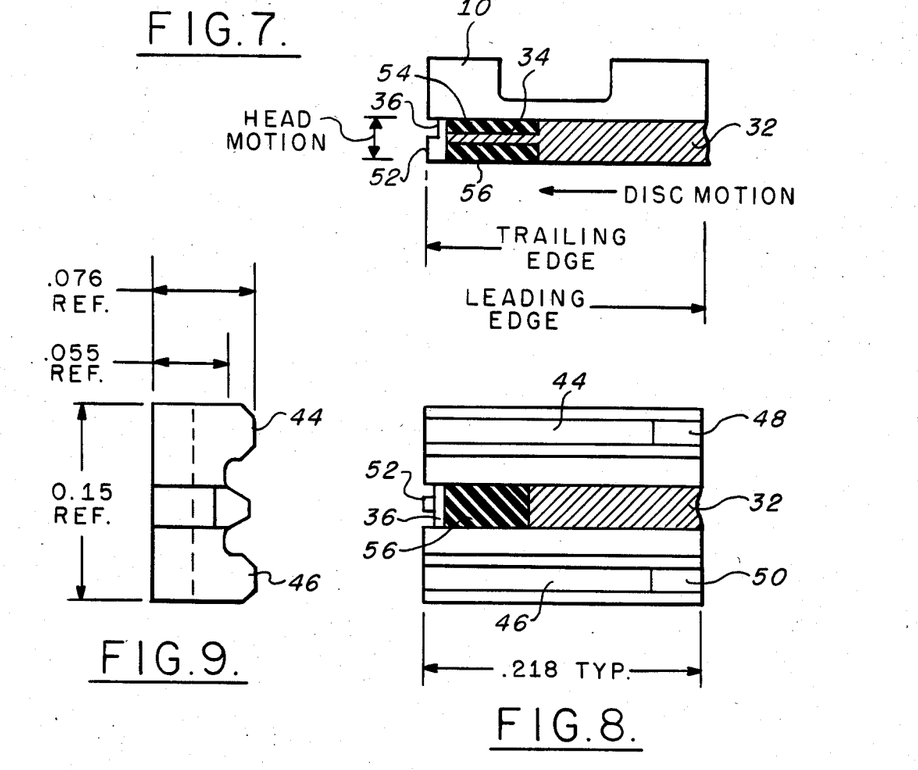
FIGS. 7, 8 and 9 show details of an air bearing slider incorporating a servo-controlled actuator beam.

The structure of the disk follower assembly as incorporated into the air bearing slider may be seen more clearly by referring to FIGS. 7-9. FIG. 7 is a cross-sectional view showing a slider 10 with embedded beam 32, while FIGS. 8 and 9 are respectively a bottom plan view and an end view. Rails 44 and 46 define a channel in which beam 32 is embedded. Rails 44 and 46, which provide the air bearing support, include beveled edges 48 and 50, respectively. A magnetic thin film head 52 is supported by the cantilevered distal edge 36 of beam 32. Deflectable piezoelectric transducer elements 54 and 56 are mounted on opposing surfaces of flexible vane 34.

Figure 101:
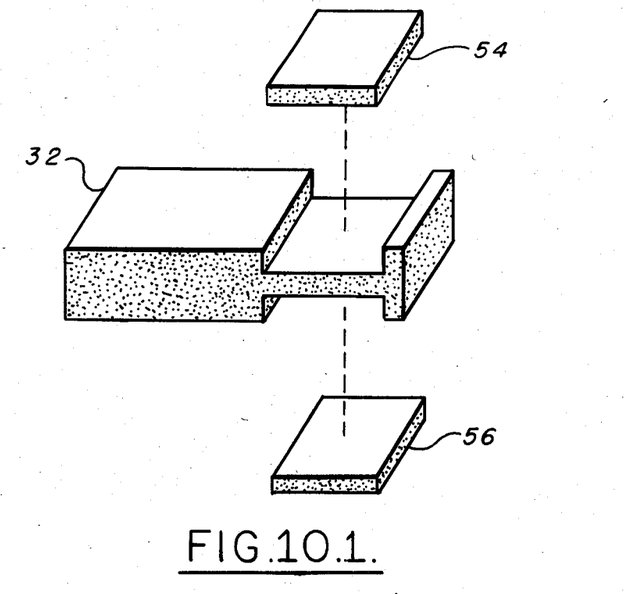

The assembly of the actuator beam structure is shown in exploded view, FIG. 10.1. The main structural element is beam 32. The material chosen for fabrication of the beam must possess a number of desirable properties, as follows:

1. ease of fabrication
2. resistance to sliding contact wear
3. fracture-resistance
4. high fatigue strength
5. low density
6. temperature coefficient similar to slider
7. temperature coefficient similar to piezoelectric (PZT) material.

Beryllium copper is a material in common use which possesses satisfactory machining properties. However, a hot-pressed silicon nitride ceramic has been found to possess more desirable properties for use with a thin film head. A suitable material is NORALIDE ® NC-132, a product of the Norton Company, Worcester, Mass. 01606. It can be machined to extremely close tolerances and will maintain these dimensions at high temperatures and in severe chemical or mechanical environments. Because shape capability with uniform properties is rather limited, it is supplied in a billet form and diamond-machined from rough blanks or billet stock. In the embodiment shown in FIG. 10, silicon nitride blanks were sliced into beams and ground to a finish dimension of 0.030 square by 0.23 long. In production, such beams could be sliced apart after the assembly of an entire blank. Slicing was performed by diamond sawing. Other methods such as ultrasonic machining and etching may also be used. After machining, the beams are lapped to assure both flatness and a reflective surface by using a succession of grades of diamond powder (6, 3, and 1 micron) against a tin-lead plate. Special attention is necessary in order to preserve the hammerhead portion of the beam during lapping to preclude roll-off of the edge. For this purpose, a preferential lapping, with the motion parallel to the structure and support by adjacent pieces of silicon nitride, is helpful. After fabrication, the beam is metallized except at the head mounting area to provide electrical continuity to the PZT elements, since the ceramic is nonconductive.

Figure 102:
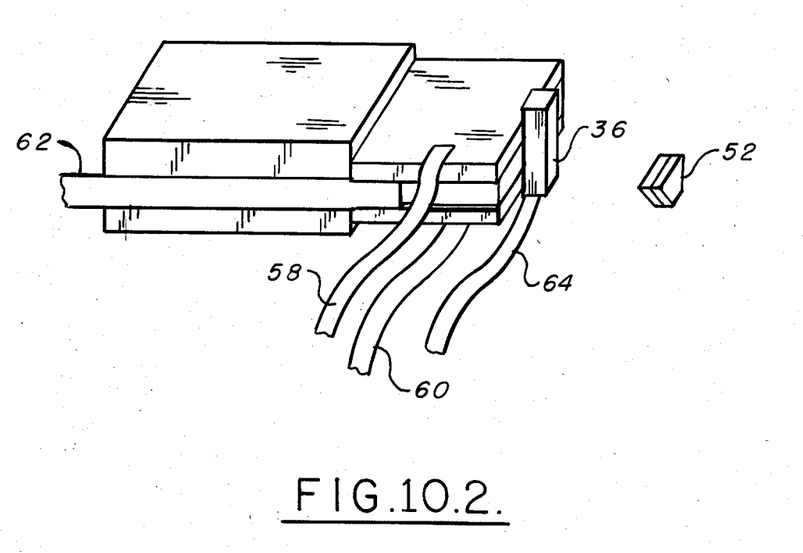

Next, the upper PZT element 54 and lower PZT element 56 are cut to size and bonded to the beam with a thin film of stiff epoxy. The PZT material must be applied with some pressure to minimize the thickness of the epoxy layer. Excess epoxy may be removed with an acetone scrub after hardening. This sandwich assembly is shown in FIG. 10.2. The hammerhead 36 may also be sawed to provide a narrower surface on which the magnetic head 52 is mounted. Thus, with the base of the beam 32 rooted in the slider, the head 52 may be bent downward to decrease clearance to the magnetic disk and upward to increase it. The bending action is accomplished herein electrically by use of the piezoelectric elements integrally affixed to the beam's upper and lower surfaces. When the upper element is lengthened and the lower is shortened, the beam bends downward. Conversely, when the upper element is shortened and the lower is lengthened, the beam bends upwards. The piezoelectric stress is controlled by external driving circuitry to be described below. The present invention includes a supporting vane for structural reasons. It provides a foundation for the recording head (which is preferably of the thin film type) and provides a structure for attaching the beam to the slider. The beam structure herein is machined from a single piece of material in order to avoid a joint which could compromise dimensional stability. It is desirable to make the vane portion of the beam as long as possible to provide the maximum mechanical advantage, but lengthening the beam results in reducing the resonant frequency of the structure. Resonance must be avoided to assure that the tip deflection is directly proportional to the driving excitation. As the driving frequency approaches resonance, the deflection will be magnified by a factor as great as ten because the electrical excitation is in phase with and reinforces the natural swings of the beam. It can be shown that the vertical deflection of such a beam for the small deflections which prevail here is proportional to the square of its length for a given electrical excitation, while the resonant frequency is inversely proportional to the square of the length. Further, the tip motion is reduced sharply by vane thickness and, to a lesser degree, by vane stiffness. For a beam 0.23 inches in length and 0.03 inches in width, a vane 0.074 inches long and 0.01 inches thick was found to provide a resonant frequency of about 50 KHz. Since the resonant frequency of the slider is in the range of 5 KHz, this structure was sufficient to assure tracking of the magnetic head with the exciting voltage. To facilitate electrical connections to the PZT elements, they are made slightly longer than the width of the beam. Connections are made to the overhang by bonding gold conductive strips with a combination of heat and ultrasonic energy in a manner well known to those skilled in the art. A one mil gold wire is suitable for the PZT electrodes 58 and 60. Electrical connections to the inner surfaces of the PZT elements are made by providing a 2-mil silver-plated copper wire 62 disposed within the overhang area and connected to the beam and inner electrodes by a conductive silver paint. A suitable epoxy for adhering the PZT elements to the beam is EPOWELD® No. 7774, available from Hardman, Inc., Belleville, N.J. A suitable material for the piezoelectric elements is Part No. 5700, as provided by Channel, Inc., Chesterland, Ohio. After assembly of the beam and PZT elements and connection of the electrodes, the magnetic head 52 may be epoxied to the hammerhead end 36 of beam 32. The resulting head structure can then be mounted directly in the slider and assembled to the suspension system.

The clearance between the magnetic head and the disk surface is preferably sensed by measuring electrical capacitance. For this purpose, an electrically conductive region is formed at the surface of the silicon nitride beam adjacent the magnetic pickup head. Copper ion implantation provides a highly conductive area and does not degrade the excellent surface wear characteristics of silicon nitride. Connection to the implanted region is made by silver conductive paint to a suitable conductor 64. Alternatively, the area adjacent to the disk surface may be metallized, in lieu of ion-implantation.

The use of capacitance transducers for the measurement of small displacements have been applied extensively in industry. The principle is based on the change in capacitance between the implanted area of the beam and the magnetic medium acting as a ground plane. Thus, the capacitance observed is inversely proportional to distance. Typical values of capacitance for the beam dimensions previously given are in the range of 1 pf. By exciting the capacitive sensor from a high frequency source through a bridge circuit with a reference capacitor, an AC output voltage may be obtained which is proportional to the capacitive reactance. The sensor output is then filtered and applied to a driver circuit. The driver must provide an output of the order of ±75 volts across each element to deflect the magnetic head over ±25 microinches. Note that the driver circuit must also be capable of supplying the capacitive loading imposed by the piezo-electric elements, which is of the order of 250 pf. The signal from the sensor is also applied to a comparator which is referenced to a desired magnetic head height, so that an error signal is developed when the magnetic head deviates from the desired set point. By means of this closed loop, the piezoelectric elements will maintain the magnetic head at the desired slider to magnetic disk distance.

Figure 11:
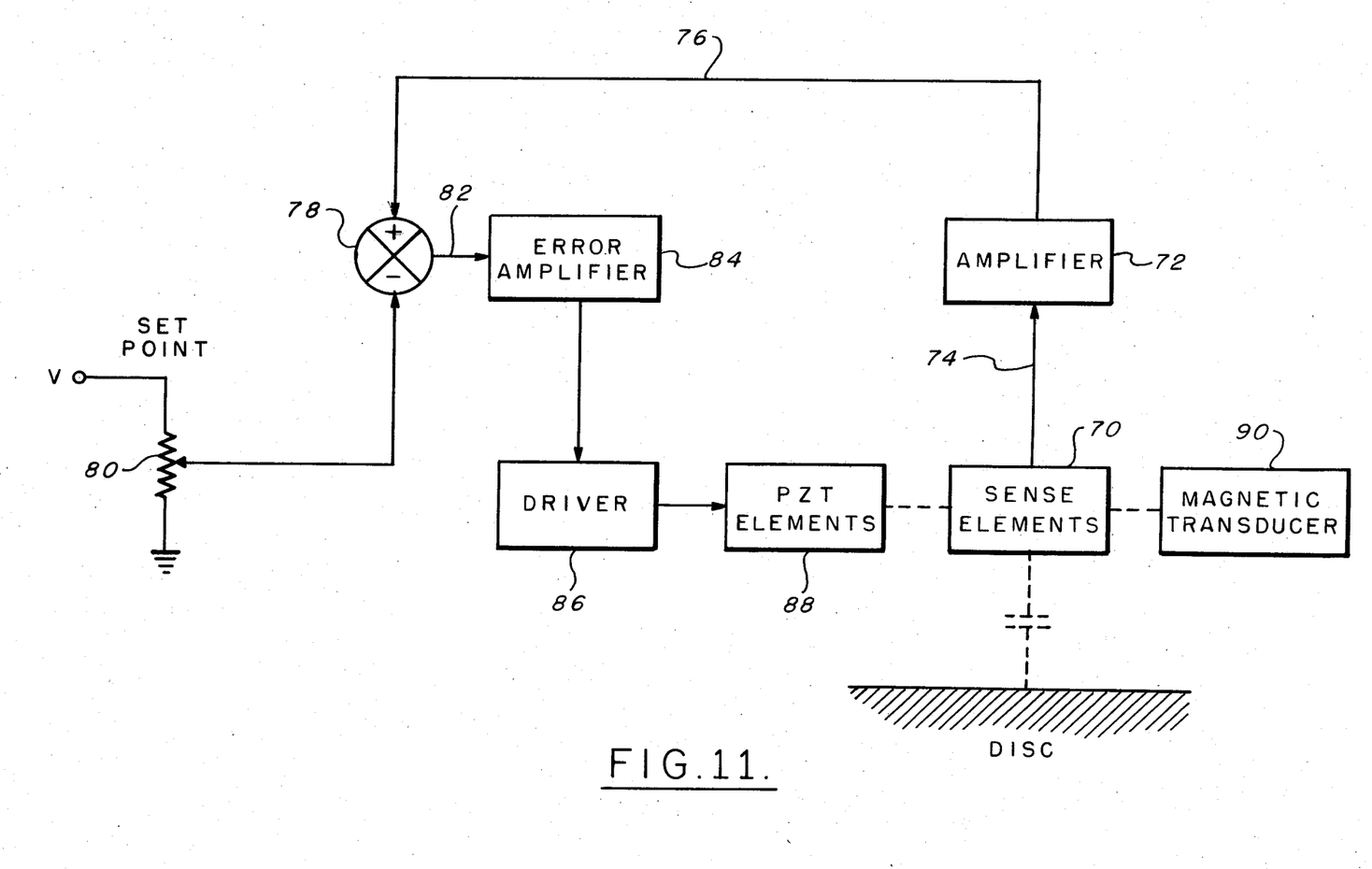
FIG. 11 shows a block diagram of the servo control system.

A suitable circuit for controlling the disk follower is shown in FIG. 11. The proximity sense electrode 70, preferably shown here as a capacitance sensing element, is coupled to an amplifier 72 lead 74. The amplifier output at lead 76 is supplied to summing network 78. Network 78 also receives an input from reference voltage source 80 to preset the desired head-to-medium clearance. The error voltage output on lead 82 voltage is scaled in amplifier 84 to produce a suitably value for energizing drive amplifier 86 which excites the piezoelectric beam actuator elements shown as block 88. The PZT elements are mechanically coupled to electrode 70 and transducer 90. The circuit may be constructed from conventional analog amplifiers and comparators, as long as the critical parameters of driving voltage and load capacitance are considered.

In operation, control 80 will be precalibrated under static conditions to preset the transducer 90 at the desired head-to-disk clearance. Such calibration may readily be performed by optical techniques. When the disk is set in motion, a capacitance is developed between the sense electrode 70 and the disk, acting as a ground plane. Any deviation in the position of transducer 90, position, which is coupled to the sense electrode, will result in a change in the effective capacitance. The capacitance change is sensed and used to develop a voltage in amplifier 72, which is coupled to summing junction 78 on lead 76. The set-point voltage is also provided to junction 78, so that a difference voltage, representing the deviation of transducer 90 from the desired head-to-disk spacing, is developed for amplification in block 84. The error amplifier output feeds driver 86, which energizes PZT elements 88. Elements 88 respond to the energization by deflecting, thereby displacing the magnetic head coupled thereto. The magnitude and direction of this deflection, and thus the magnitude and direction of displacement of the magnetic head, is a function of the amplitude and polarity of the energizing voltage supplied to the PZT elements. The error signal is polarized as is well known in the servo-amplifier art so as to reduce the displacement of the magnetic head from the preset condition. By varying control 80, the nominal head position may be varied to suit different media or operating conditions. For example, if the preset head-to-disk clearance is established at 5 microinches, and the slider-to-disk clearance normally varies over a range of 20 plus or minus 5 microinches, the system is capable of maintaining an actual head-to-disk clearance of 5±1 microinches.

Figure 12:
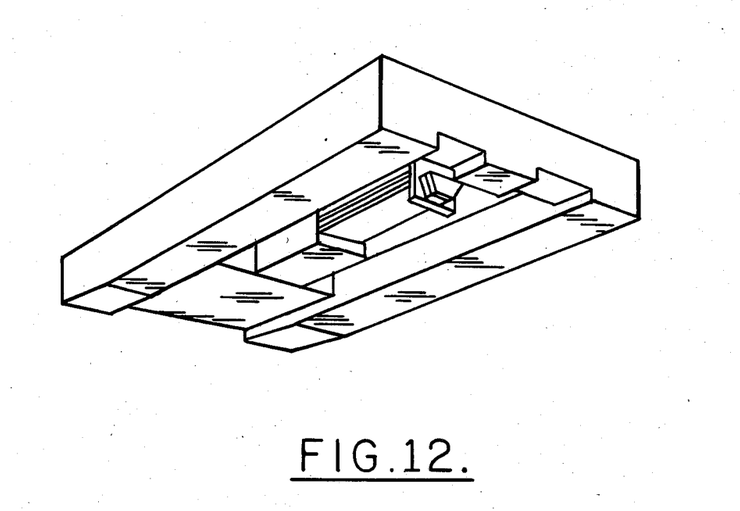
FIG. 12 is a perspective view of the disk follower and slider.

FIG. 12 shows a view of the slider assembly as used in the invention as set forth herein.

While the invention has been described in its preferred embodiments, it is to be understood that the words which have been used are words of description rather than limitation and that changes may be made within the purview of the appended claims without departing from the true scope and spirit of the invention in its broader aspects.

What is claimed is:

1. A suspension system for a flying head, comprising:
   (a) slider means for supporting a magnetic transducer, having an air bearing surface for providing a running clearance above a moving magnetic medium, said surface further comprised of respective leading and trailing ends relative to motion of a data track and a plurality of rails extending longitudinally between said ends defining a channel therein,
   (b) means for displacing said magnetic transducer coupled to said slider means for maintaining said transducer at a predetermined height above said medium,
   (c) displacement driving means, responsive to a correction signal, for providing energization of said means for displacing said magnetic transducer,
   (d) said means for displacing said magnetic transducer further comprised of a nonmetallic beam disposed in said channel, having a proximal edge affixed to said leading end and a cantilevered distal edge, including flexure means disposed therebetween and a portion therebetween comprised of piezoelectric material, for supporting said magnetic transducer at said distal edge, and
   (e) proximity sensor means coupled to said beam for capacitively sensing the displacement of said distal edge of said beam from said medium, integrally disposed upon said edge.

2. A system as set forth in claim 1, wherein said proximity sensor provides an error signal with respect to a predetermined reference signal, said reference representing said predetermined height of said transducer above said medium, and said error signal is used to derive said correction signal.

3. A system as set forth in claim 2, said means for displacing said transducer comprised of deflectable piezoelectric transducer means, mounted on said flexure means, and responsive to said displacement driving means, for deflecting said distal edge.

4. A system as set forth in claim 3, wherein said piezoelectric transducer means is comprised of upper and lower segments disposed on opposing longitudinal surfaces of said flexure means, said upper and lower segments polarized so as to deflect in like directions when respectively energized by a potential of opposing polarity with respect to ground.

5. A system as set forth in claim 4, said displacement driving means including electrical driving means, for energizing said piezoelectric transducer means, thereby to maintain said transducer at said predetermined height above said track.

6. A system as set forth in claim 5 wherein said magnetic transducer comprises a thin film head.

7. A system as set forth in claim 6, wherein said proximity sensor means comprises capacitance sensor means at least a portion of which is integrally formed of a conductive region of said beam.

8. In a suspension system for a flying head of the type having head slider means for supporting a magnetic transducer above a moving magnetic medium, said slider means having an air bearing surface, leading and trailing ends relative to motion of a data track, and a plurality of rails extending longitudinally between said ends defining a channel at said air bearing surface, means for displacing said magnetic transducer coupled to said slider means for maintaining said transducer at a predetermined height above said data track, capacitance proximity sensor means coupled to said means for displacing said magnetic transducer for sensing the height of said transducer relative to said data track and for providing an error signal with respect to a reference signal representing a predetermined height relative to said track, displacement driving means including electrical driving means, responsive to said error signal, for energizing deflectible piezoelectric transducer means, thereby to maintain said transducer at said predetermined height above said track; the improvement wherein said means for displacing is comprised of a nonmetallic beam formed of silicon nitride disposed in said channel, having a proximal edge affixed to said leading end and a cantilevered distal edge, including flexure means disposed therebetween for supporting said magnetic transducer at said distal edge, said deflectible piezoelectric transducer means mounted on said flexure means and responsive to said displacement driving means for deflecting said distal edge.

9. A beam as set forth in claim 8, wherein said proximal edge, said flexure means, and said distal edge are integrally constructed from a single piece of material.

10. A beam as set forth in claim 9, wherein said beam is preferentially metallized in predetermined regions, including said flexure means and said distal edge.

11. A beam as set forth in claim 10, further comprising a region of said distal edge implanted with copper ions, said region proximate to said magnetic transducer and said air bearing surface.

12. A suspension system as set forth in claim 8, said flexure means comprised of a region having a predetermined length and thickness to provide a first predetermined mechanical resonant frequency, said slider means having a mass providing a second predetermined mechanical resonant frequency, said first frequency being greater than said second frequency so that said flexure means is effectively mechanically decoupled from said slider when said flexure means is energized within a predetermined frequency range less than said first frequency but greater than said second frequency.

13. The flexure means as set forth in claim 12, wherein said first and second resonant frequencies are in a ratio of 10:1.

* * * * *